United States Patent
Kuroiwa et al.

(10) Patent No.: US 6,416,851 B1
(45) Date of Patent: Jul. 9, 2002

(54) BEARING FOR REFRIGERATING MACHINE COMPRESSOR AND COMPRESSOR

(75) Inventors: Hiroyuki Kuroiwa; Kenji Matsuba; Toshiaki Yoshii; Masaki Nomura; Hiroshi Kitaura, all of Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/446,483

(22) PCT Filed: Jul. 23, 1999

(86) PCT No.: PCT/JP99/03981

§ 371 (c)(1),
(2), (4) Date: Dec. 22, 1999

(87) PCT Pub. No.: WO00/06902

PCT Pub. Date: Feb. 10, 2000

(30) Foreign Application Priority Data

Jul. 29, 1998 (JP) .......................................... 10-214018

(51) Int. Cl.[7] ................................................ B32B 3/26
(52) U.S. Cl. ............................... 428/304.4; 428/307.3; 428/318.4; 418/55.6; 384/261; 62/114
(58) Field of Search ..................... 428/307.3, 312.8, 428/313.9, 304.4, 318.4, 319.1, 319.3; 418/55.6, 88, 87, 89, 91, 92, 93, 94; 384/261; 62/114

(56) References Cited

U.S. PATENT DOCUMENTS

| 4,134,712 A | * | 1/1979 | Kemmner et al. |
| 4,294,712 A | | 10/1981 | Ueno et al. ................... 252/12 |
| 4,394,275 A | * | 7/1983 | Bickle et al. |
| 4,439,484 A | * | 3/1984 | Mori |
| 4,702,681 A | * | 10/1987 | Inaba et al. |
| 4,812,367 A | * | 3/1989 | Bickle |
| 4,877,813 A | * | 10/1989 | Jinno et al. |
| 4,954,057 A | * | 9/1990 | Caillat et al. |
| 5,024,882 A | * | 6/1991 | Matucha et al. |
| 5,162,157 A | * | 11/1992 | Tanaka et al. |
| 5,256,042 A | * | 10/1993 | McCullough et al. |
| 5,265,691 A | * | 11/1993 | Konishi et al. |
| 5,395,224 A | * | 3/1995 | Caillat et al. |
| 5,462,813 A | * | 10/1995 | Nagano et al. |
| 5,601,386 A | * | 2/1997 | Wells |
| 5,629,082 A | * | 5/1997 | Baureis et al. |
| 5,637,940 A | * | 6/1997 | Nagai et al. |
| 5,860,780 A | * | 1/1999 | Lenac et al. |
| 6,042,778 A | * | 5/2000 | Kraft et al. |
| 6,055,827 A | * | 5/2000 | Tojo et al. |
| 6,106,936 A | * | 8/2000 | Adam |
| 6,129,531 A | * | 10/2000 | Elson et al. |
| 6,162,767 A | * | 12/2000 | Adam |
| 6,189,322 B1 | * | 2/2001 | Ishihara et al. |

FOREIGN PATENT DOCUMENTS

| JP | 56-131828 | 10/1981 |
| JP | 58-28016 | 2/1983 |
| JP | 59-080522 | 5/1984 |
| JP | 59-194128 | 11/1984 |
| JP | 62-080310 | 4/1987 |
| JP | 08-128448 | 5/1996 |

* cited by examiner

Primary Examiner—Tom Dunn
Assistant Examiner—Colleen P. Cooke
(74) Attorney, Agent, or Firm—Burns, Doane, Swecker & Mathis, LLP

(57) ABSTRACT

A porous bronze 1b and a resin 1c impregnated in pores of the porous bronze 1b formed on a backing metal 1a constitute a bearing 1. At a surface to be brought into contact with a crank shaft 5, porous bronze 1b and resin 1c are sparsely exposed. Ratio of area of exposure of porous bronze 1b at the contact surface 1d is at least 5% and at most 60%. Thus a bearing for a refrigerating compressor having high seizure resistance at the time of boundary lubrication and having small amount of wear caused by sliding as well as a refrigerating compressor employing the same can be obtained.

11 Claims, 4 Drawing Sheets

BEARING FOR REFRIGERATING MACHINE COMPRESSOR AND COMPRESSOR

TECHNICAL FIELD

The present invention relates to a bearing for refrigerating compressor and to a refrigerating compressor.

BACKGROUND ART

CFC (chlorofluorocarbon) and HCFC (hydrochlorofluorocarbon) have been used as refrigerants for refrigerating compressor. Recently, however, in order to prevent destruction of ozone layer by chlorine contained in CFC and HCFC, HFC (hydrofluorocarbon) not containing chlorine has come to be used as a substitute refrigerant.

As the refrigerants is changed, it becomes necessary to change the material of the bearing for the refrigerating compressor, since HFC as the substitute refrigerant apt to cause corrosion of a material containing Al (aluminum) which has been used for the bearing. Accordingly, use of a material containing bronze, for example, has been studied as the material of the bearing. Japanese Patent Laying-Open No. 59-194128, for example, discloses a technique using a material containing bronze for the bearing.

The above described Laid-Open Application discloses a bearing for a refrigerating compressor in which a porous bronze based alloy impregnated with a compound substance including synthetic resin and lubricant is formed sintered on a backing metal. The bearing is so formed that both the porous bronze based alloy and the compound substance are sparsely exposed at a contact face with the shaft.

The aforementioned Laid-Open Application, however, does not at all disclose the ratio of exposure of the porous bronze based alloy at the surface to be in contact with the shaft. Therefore, the bearing in accordance with this application had the problem that seizure possibly occurs as sintering resistance lowers at the time of boundary lubrication, and that bearing clearance increases as the amount of wear increases by sliding, resulting in pries and seizure.

DISCLOSURE OF THE INVENTION

An object of the present invention is to provide a bearing for a refrigerating compressor having high seizure resistance at the time of boundary lubrication and small amount of wear caused by sliding, as well as to provide a refrigerating compressor including the same.

Through extensive study, the inventors have found that in a bearing for a refrigerating compressor, by changing the ratio of exposure of the porous bronze based alloy at the contact surface (sliding surface) with the shaft, seizure resistance and wear resistance can be changed. Further, the inventors have found that if the ratio of exposure is set within the prescribed range, a bearing satisfying both the wear resistance and seizure resistance appropriate for a bearing of a refrigerating compressor can be obtained.

Therefore, the bearing for a refrigerating compressor in accordance with the present invention includes a porous bronze based alloy and a resin material impregnated in pores of the porous bronze based alloy, wherein the porous bronze based alloy and the resin material are exposed at the sliding surface, with the ratio of the exposed area of the porous bronze based alloy at the sliding surface being at least 5% and at most 60%.

In the bearing for a refrigerating compressor in accordance with the present invention, the ratio of the exposed area of the porous bronze based alloy at the sliding surface is set to 5% to 60%, as the amount of wear caused by sliding is considerably large when the ratio is smaller than 5%, and seizure is likely as the seizure resistance extremely lowers when the ratio exceeds 60%. Accordingly, a bearing for a refrigerating compressor having high seizure resistance at the time of boundary lubrication, for example, and having small amount of wear caused by sliding can be obtained.

Porous bronze based alloy is used as it is not susceptible to corrosion caused by the substitute refrigerant, and seizure of the bearing can be avoided as the bronze based alloy has high thermal conductivity. Further, the bronze based alloy is made porous, since resin entering the pores establishes strong bond between the backing metal and the bronze based alloy, so that dropping of the bronze based alloy caused by wear at the time of sliding can be prevented. Further, resin material is used to prevent seizure, as seizure is likely when bronze based alloy alone is used.

Further, sparse exposure of the porous bronze based alloy and the resin material at the contact surface with the shaft is preferred. This allows as uniform as possible development of both the wear resistance of the bronze based alloy and the seizure resistance of the resin material.

In the present specification, the porous bronze based alloy refers to the porous bronze, which is an alloy of copper and tin, and it means not only the material formed solely of porous bronze but also a material containing not only the porous bronze but other elements.

In the bearing for a refrigerating compressor described above, the ratio of the exposed area of the porous bronze based alloy at the sliding surface should preferably be at least 5% and at most 30%.

The ratio of the exposed area of the porous bronze based alloy at the sliding surface is set to be at most 30%, as maximum effect of seizure resistance is attained in this range.

In the bearing for a refrigerating compressor described above, preferably, a backing metal is further provided, and the porous bronze based alloy and the resin material are formed on the backing metal.

Accordingly, as the resin enters the pores of the porous bronze based alloy, the bronze based alloy can be strongly bonded to the backing metal, and therefore dropping of the bronze based alloy caused by wear at the time of sliding can be prevented.

In the bearing for a refrigerating compressor described above, preferably, the refrigerant compressed by the refrigerating compressor is hydrofluorocarbon based substitute refrigerant not containing chlorine.

As the substitute refrigerant is used, destruction of ozone layer can be prevented, and the bearing in accordance with the present invention is hardly corroded even when the substitute refrigerant is used.

In the bearing for a refrigerating compressor described above, preferably, the resin material contains a compound substance including synthetic resin and the lubricant.

Therefore, the resin material can be appropriately selected dependent on the state of use.

In the bearing for a refrigerating compressor described above, the synthetic resin contains poly tetrafluoro ethylene, and the lubricant preferably contains lead.

Thus the material of the synthetic resin can be appropriately selected, and lead improves lubricancy.

In the bearing for a refrigerating compressor described above, preferably, the refrigerating compressor contains oleo polyacetal resin.

Accordingly, the resin material can be appropriately selected.

The refrigerating compressor in accordance with the present invention includes a scroll type compressing element having an orbiting scroll, a driving shaft for transmitting driving force to the orbiting scroll, and a bearing arranged at a portion which slides over the driving shaft, wherein the bearing includes porous bronze based alloy and resin material impregnated in the pores of the porous bronze based alloy, the porous bronze based alloy and the resin material being exposed at the sliding surface, with the area of exposure of the porous bronze based alloy at the sliding surface being at least 5% and at most 60%.

Thus, a refrigerating compressor including a bearing having high seizure resistance at the time of boundary lubrication or the like and small amount of wear caused by sliding can be obtained.

In the refrigerating compressor described above, the bearing is preferably a journal bearing arranged at a sliding portion where the orbiting scroll and the driving shaft slide over each other.

Therefore, at the sliding portion between the orbiting scroll and the driving shaft, seizure resistance at the time of boundary lubrication or the like can be improved, and the amount of wear caused by sliding can be reduced.

In the refrigerating compressor described above, the bearing is preferably a journal bearing arranged at the sliding portion between a housing and the driving shaft.

Thus, at the sliding portion between the housing and the driving shaft, seizure resistance at the time of boundary lubrication or the like can be improved, and the amount of wear caused by sliding can be reduced.

The refrigerating compressor described above preferably has a structure in which oil is supplied to the bearing through an oil feed inlet provided at the driving shaft.

As described above, the bearing used in the present invention has high seizure resistance and small amount of wear caused by sliding. Therefore, even when oil supply to the bearing portion becomes insufficient temporarily resulting in boundary lubrication, seizure and wear can be prevented, and therefore it is optimal for the refrigerating compressor having the above described oil feed path.

BEST MODE FOR CARRYING OUT THE INVENTION

The best mode of the present invention will be described in the following with reference to the figures.

Figure 1:
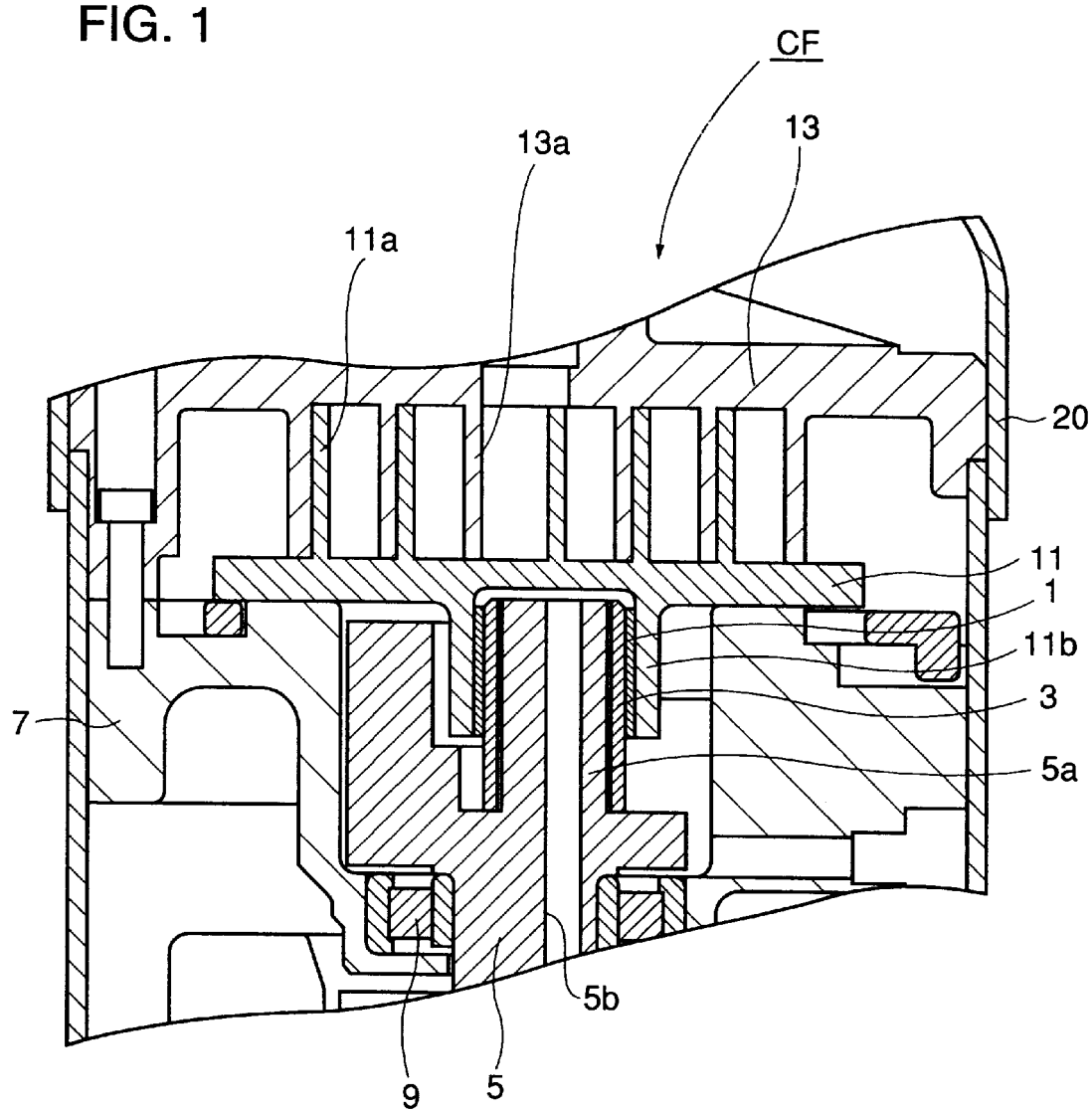
FIG. 1 is a schematic cross section partially representing a structure of a refrigerating compressor in accordance with an embodiment of the present invention.

Referring to FIG. 1, in a sealed container 20, a motor (not shown) and a compressing element CF are arranged as main components.

At an upper end of a crank shaft 5 coupled to a rotor (not shown) of the motor, an eccentric portion 5a decentered from crank shaft 5 is provided, and at the eccentric portion 5a, a cylindrical sliding bush 3 is fitted idly. Sliding bush 3 is received by a boss portion 11b of orbiting scroll 11. An inner peripheral surface of a journal bearing 1 attached to the inner peripheral surface of boss portion 11b and an outer peripheral surface of sliding bush 3 provide a sliding portion. Thus, the driving force of crank shaft 5 is transmitted through sliding bush 3 to orbiting scroll 11, whereby orbiting scroll 11 revolves.

By the revolution of the orbiting scroll 11, a compressing chamber constituted by respective spiral wrap portions 11a and 13a of orbiting scroll 11 and fixed scroll 13 moves gradually from the outer peripheral side to the inner peripheral side of the scroll with its volume reduced gradually. Thus the refrigerant gas in the compressing chamber is gradually compressed to reach the compression chamber in the innermost periphery, and discharged from an outlet.

An oil feed inlet 5b extending from a lower portion (not shown) of the refrigerating compressor to an end surface of eccentric portion 5a is provided at crank shaft 5. By the oil feed inlet 5b, oil is guided from an oil pit at a lower portion of the refrigerating compressor to the end surface of eccentric portion 5a, and thereafter fed to the sliding portion between journal bearing 1 and sliding bush 3.

The structure of journal bearing 1 shown in FIG. 1 will be described in detail in the following.

Figure 2:
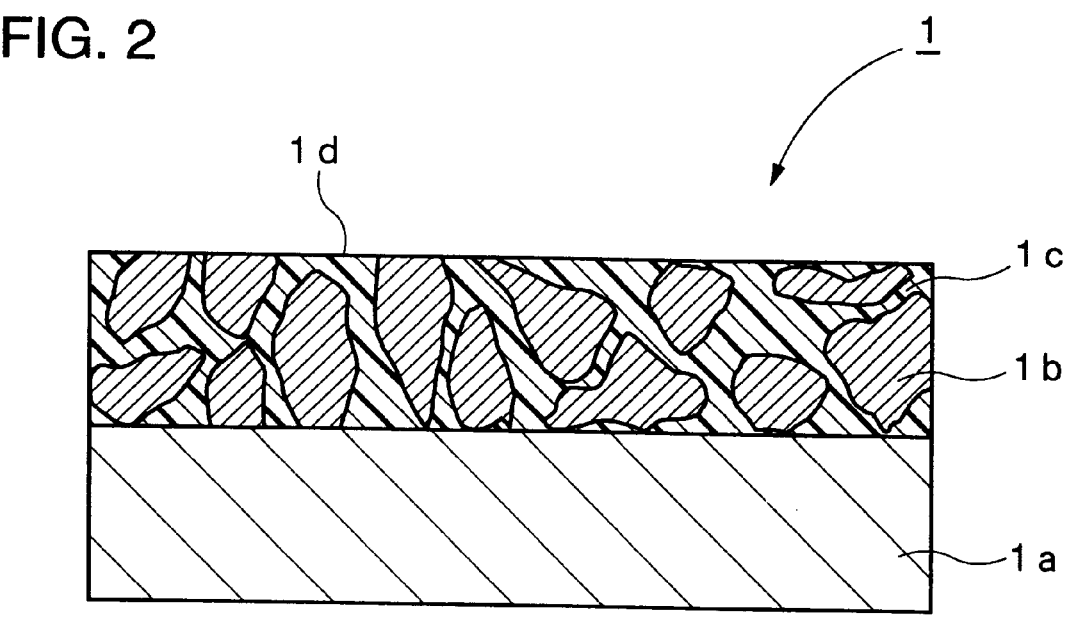
FIG. 2 shows a cross sectional structure of a journal bearing.

Referring to FIG. 2, journal bearing 1 has a backing metal 1a, porous bronze 1b and resin 1c. Porous bronze 1b and resin 1c impregnated in the pores of porous bronze 1b are formed on backing metal 1a. At a contact surface (sliding surface) 1d which is brought into contact with sliding bush 3, porous bronze 1b and resin 1c are sparsely exposed. At the contact surface 1d, the ratio of the area of exposure of porous bronze 1b is at least 5% and at most 60%. Preferably, the ratio of the area of exposure of porous bronze 1b at contact surface 1d is at least 5% and at most 30%.

Using the refrigerating compressor shown in FIGS. 1 and 2, the inventors measured the bearing pressure and wear amount with the ratio of the area of exposure (exposure ratio) of bronze varied. The results are as shown in FIGS. 3 and 4.

Figure 3:
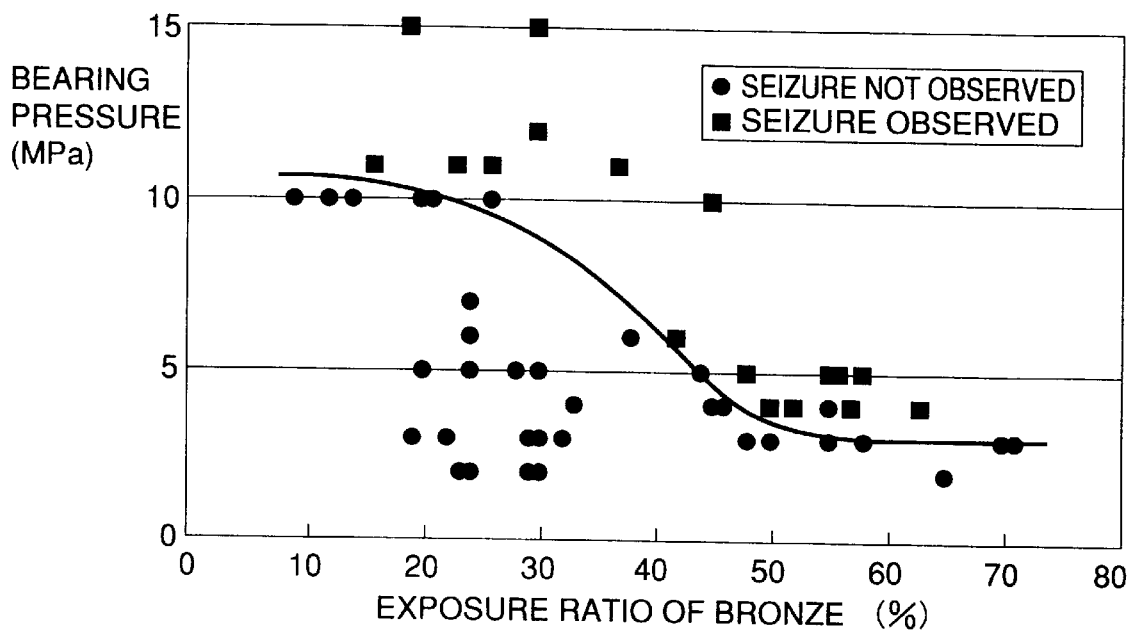
FIG. 3 represents a relation between bronze exposure ratio and seizure pressure at a contact surface with a crank shaft.

First referring to FIG. 3, it has been found that bearing pressure decreases when the exposure ratio of bronze increases. Especially, it was found that when the exposure ratio of bronze exceeds 60%, bearing pressure is lowered to about 3 MPa, easily causing seizure. Further, it has been found that when the exposure ratio of bronze is at most 30%, bearing pressure can be set extremely high as about 10 MPa, and that almost maximum effect of seizure resistance can be attained.

Figure 4:
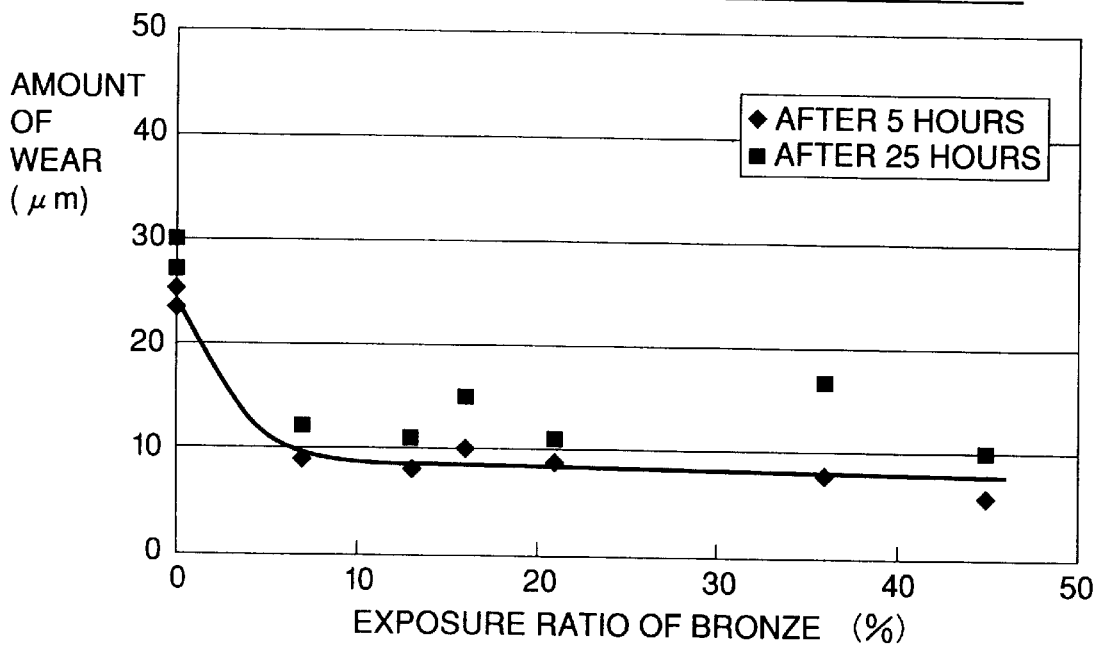
FIG. 4 represents relation between the bronze exposure ratio and amount of wear at the contact surface with the crank shaft.

Next, referring to FIG. 4, it has been found that when the exposure ratio of bronze is increased, the amount of wear can be reduced. Further, it has been found that when the exposure ratio of bronze is smaller than 5%, the amount of wear abruptly increases.

From the results shown in FIGS. 3 and 4, it has been found that when the ratio of the area of exposure of bronze is at least 5% and at most 60%, a bearing for a refrigerating compressor having both superior seizure resistance and superior wear resistance can be obtained. Further, it has been found that when the exposure ratio of bronze is at least 5% and at most 30%, a bearing for a refrigerating compressor having higher seizure resistance can be obtained.

As the journal bearing 1 in accordance with the present embodiment has both high seizure resistance and high wear resistance, it is especially suitable for a refrigerating compressor having such a structure in that oil is fed to the sliding portion between journal bearing 1 and sliding bush 3 through oil feed inlet 5b as shown in FIG. 1. Though porous bronze 1b is used in the present embodiment, the material is not limited to porous bronze 16, and a material containing porous bronze may be used. In this sense, porous bronze based alloy may be used. Though resin 1c is used, a material containing resin, for example, a compound substance including a synthetic resin and a lubricant may be used, or a material containing PTFE (poly tetrafluoro ethylene) and lead may be used, for this portion 1c. Here, lead serves to improve lubricancy. Further, the material of resin 1c may include an oleo polyacetal resin.

Figure 5:
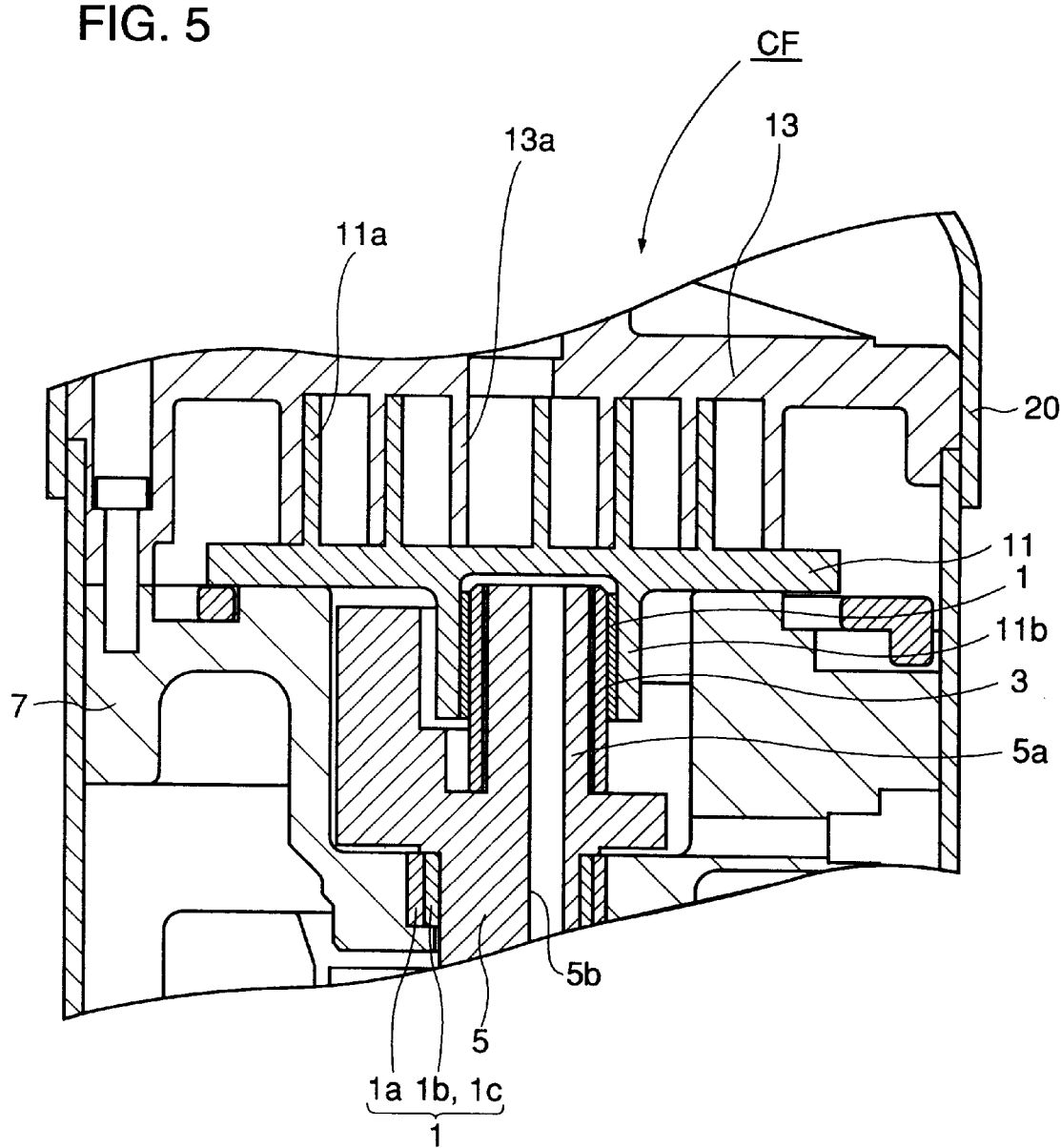
FIG. 5 is a schematic cross section showing a journal bearing arranged at the sliding portion between the housing and the crank shaft.

In the structure shown in FIG. 1, a roller bearing 9 is used for supporting crank shaft 5 at upper housing 7. In place of roller bearing 9, journal bearing 1 having such a structure as shown in FIG. 2 formed of backing metal 1a, porous bronze 1b and resin 1c as shown in FIG. 5 may be used. Though not shown in FIG. 1, a journal bearing having such a structure as shown in FIG. 2 may be used between a lower housing and crank shaft 5.

In the structure shown in FIG. 1, a scroll type compressing element CF has been described. The compressing element, however, is not limited thereto, and any compressor for a refrigerator may be used.

It should be understood that the embodiment disclosed herein is by way of illustration in every point and is not to be taken by way of limitation. The scope of the present invention is limited not by the description above but by the terms of claims, and all modifications are covered within the scope of claims and the equivalents thereof.

INDUSTRIAL APPLICABILITY

The present invention is advantageously applicable to a bearing for a refrigerating compressor requiring seizure resistance and wear resistance as well as to a refrigerating compressor having the same.

What is claimed is:

1. A bearing for a refrigerating compressor, comprising a porous bronze based alloy and a resin material impregnated in pores of said porous bronze based alloy, said porous bronze based alloy and said resin material being exposed at a sliding surface, and ratio of area of exposure of said porous bronze based alloy at said sliding surface being at least 5% and at most 45%.

2. The bearing for a refrigerating compressor according to claim 1, wherein the ratio of area of exposure of said porous bronze based alloy at said sliding surface is at least 5% and at most 30%.

3. The bearing for a refrigerating compressor according to claim 1, further comprising a backing metal, wherein said porous bronze based alloy and said resin material are formed on said backing metal.

4. The bearing for a refrigerating compressor according to claim 1, wherein said bearing is suitable for use in said refrigerating compressor having a hydrofluorocarbon based substitute refrigerant not including chlorine.

5. The bearing for a refrigerating compressor according to claim 1, wherein said resin material includes a compound substance including a synthetic resin and a lubricant.

6. The bearing for a refrigerating compressor according to claim 5, wherein said synthetic resin includes poly tetrafluoro ethylene and said lubricant includes lead.

7. The bearing for a refrigerating compressor according to claim 1, wherein said resin material includes oleo polyacetal resin.

8. A refrigerating compressor, comprising a scroll type compressing element having an orbiting scroll, a driving shaft for transmitting driving force to said orbiting scroll and a bearing arranged at a sliding portion with said driving shaft, wherein said bearing includes a porous bronze based alloy and a resin material impregnated in pores of said porous bronze based alloy, said porous bronze based alloy and said resin material being exposed at the sliding surface, and ratio of area of exposure of said porous bronze based alloy at said sliding surface being at least 5% and at most 45%.

9. The refrigerating compressor according to claim 8, wherein said bearing is a journal bearing arranged at a sliding portion between said orbiting scroll and said driving shaft.

10. The refrigerating compressor according to claim 8, wherein said bearing is a journal bearing arranged at a sliding portion between a housing and said driving shaft.

11. The refrigerating compressor according to claim 8, having such a structure in that oil can be fed from an oil feed inlet provided at said driving shaft to said bearing.

* * * * *